US008776062B2

(12) United States Patent
Garbow et al.

(10) Patent No.: US 8,776,062 B2
(45) Date of Patent: Jul. 8, 2014

(54) DETERMINING DESIRED JOB PLAN BASED ON PREVIOUS INQUIRIES IN A STREAM PROCESSING FRAMEWORK

(75) Inventors: Zachary Adam Garbow, Rochester, MN (US); Michael Donald Pfeifer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1287 days.

(21) Appl. No.: 11/852,389

(22) Filed: Sep. 10, 2007

(65) Prior Publication Data

US 2009/0070767 A1   Mar. 12, 2009

(51) Int. Cl.
*G06F 9/46* (2006.01)
*G06F 17/30* (2006.01)

(52) U.S. Cl.
USPC ............ 718/101; 707/713; 707/736; 707/769

(58) Field of Classification Search
None
See application file for complete search history.

(56) References Cited

U.S. PATENT DOCUMENTS

| | | | | |
|---|---|---|---|---|
| 6,298,343 | B1 * | 10/2001 | Chang et al. .......................... | 1/1 |
| 7,107,262 | B2 * | 9/2006 | Dettinger et al. ..................... | 1/1 |
| 7,747,606 | B2 * | 6/2010 | Dageville et al. ............. | 707/713 |
| 7,962,466 | B2 * | 6/2011 | Jones et al. .................... | 707/706 |
| 2005/0065921 | A1 * | 3/2005 | Hrle et al. ......................... | 707/3 |
| 2007/0067283 | A1 * | 3/2007 | Sengupta ........................... | 707/5 |

OTHER PUBLICATIONS

Foster et al., "The Anatomy of the Grid: Enabling Scalable Virtual Organizations", Lecture Notes in Computer Science, 2150 (2001).
Abadi, et al.,"The Design of the Borealis Stream Processing Engine", CIDR 2005—Second Biennial Conference on Innovative Data Systems Research (2005).
Chandrasekaran et al., "Continuous Dataflow Processing for an Uncertain World", Conference on Innovative Data Systems Research (2003).
Arasu et al., The Stream Group, "Stream: The Stanford Stream Data Manager", IEEE Data Engineering Bulletin, 26(1), (2003).
Stonebraker et al., "The 8 Requirements of Real-Time Stream Processing", SIGMOD Record, 34(4):42-47, (2005).
Werner-Allen et al., "Deploying a Wireless Sensor Network on an Active Volcano", IEEE Internet Computing, 10(2):18-25 (2006).
Risch et al., "High-performance GRID Database Manager for Scientific Data", Proceedings of 4thWorkshop on Distributed Data & Structures (WDAS-2002), Carleton Scientific (Publ), 2002.
Douglis et al., "Short Object Lifetimes Require a Delete-Optimized Storage System", Proceedings of IIth ACM SIGOPS European Workshop (2004).

(Continued)

*Primary Examiner* — Abdullah Al Kawsar
*Assistant Examiner* — Wissam Rashid
(74) *Attorney, Agent, or Firm* — August Law, LLC

(57) ABSTRACT

A data stream processing system is provided that utilizes independent sites to process user-defined inquires over dynamic, continuous streams of data. A mechanism is provided for processing these inquiries over the continuous streams of data by matching new inquiries to previously submitted inquiries. The job plans containing sets of processing elements that were created for both the new inquiry and the previous inquiries are compared for consistency in input and output formatting and commonality of processing elements used. In accordance with the comparison, the new job plan, previous job plans or a combination of the new and previous job plans are used to process the new inquiry. Based on the results of processing the new inquiry, a determination is made regarding which job plans are used for future inquiries.

20 Claims, 6 Drawing Sheets

(56) References Cited

OTHER PUBLICATIONS

Riabovet al., "Planning for Stream Processing Systems", Proceedings of AAAI-2005, Jul. 2005.

Riabov et al., "Scalable Planning for Distributed Stream Processing Systems", Proceedings of ICAPS 2006, Jun. 2006.

Zhou et al., "A Scalable Owl Ontology Storage and Inference System", The First Asian Semantic Web Symposium (2004).

* cited by examiner

DETERMINING DESIRED JOB PLAN BASED ON PREVIOUS INQUIRIES IN A STREAM PROCESSING FRAMEWORK

STATEMENT REGARDING FEDERALLY SPONSORED RESEARCH

The invention disclosed herein was made with U.S. Government support under Contract No. H98230-05-3-0001 awarded by the U.S. Department of Defense. The Government has certain rights in this invention.

FIELD OF THE INVENTION

The present invention relates to data analysis in continuous data streams.

BACKGROUND OF THE INVENTION

Systems for processing streams of data utilize continuous streams of data as inputs, process these data in accordance with prescribed processes and produce ongoing results. Commonly used data processing stream structures perform traditional database operations on the input streams. Examples of these commonly used applications are described in Daniel J. Abadi et al., *The Design of the Borealis Stream Processing Engine*, CIDR 2005—Second Biennial Conference on Innovative Data Systems Research (2005), Sirish Chandrasekaran et al., *Continuous Dataflow Processing for an Uncertain World*, Conference on Innovative Data Systems Research (2003) and The STREAM Group, *STREAM: The Stanford Stream Data Manager*, IEEE Data Engineering Bulletin, 26(1), (2003). In general, systems utilize traditional database structures and operations, because structures and operations for customized applications are substantially more complicated than the database paradigm. The reasons for this comparison are illustrated, for example, in Michael Stonebraker, Ugur Ç etintemel, and Stanley B. Zdonik, *The 8 Requirements of Real-Time Stream Processing*, SIGMOD Record, 34(4):42-47, (2005).

These systems typically operate independently and work only with the processing resources contained within a single system to analyze streams of data that are either produced by or directly accessible by the single site. Although multiple sites can be used, these sites operate independently and do not share resources or data.

In a data stream processing framework, a subset of available processing elements is used in conjunction to analyze, filter, and annotate streams of data. Continuous data streams flow between processing elements in accordance with a job plan. Each processing element performs a specific processing task on the stream of data. The job plan can be assembled manually by hand or automatically by a job manager. In larger continuous data stream processing applications, job plans are more likely to be automatically generated due to the large number of available processing elements. Many processing elements may perform similar tasks with slightly different input or output requirements or implementations. Manual determination of which processing elements, out of thousands of available processing elements to use in conjunction in order to produce the desired analysis and results is extremely difficult, if not impossible, to accomplish. An automatically generated job plan is used to plan and to update stream processing jobs without manual intervention. Therefore, if a new processing element is introduced into the data stream processing system that provides better performance or results, that new processing element can be automatically inserted into the appropriate jobs.

While automatic job planning dynamically generates the job plan using the most effective or efficient processing elements for a given inquiry, sub-optimal selection of processing elements may be necessary for purposes of consistency in results over time. Automatic job planning, however, always produces a job plan based on the most optimal use of the currently available processing elements. Therefore, the need exists for job planners to determine instances in which a user may wish to use a less than optimal set of processing elements.

SUMMARY OF THE INVENTION

Systems and methods in accordance with the present invention provide for a job planner that compares a new inquiry to previous inquiries to determine whether previously created job plans for previous inquiries that are sufficiently similar to the new inquiry have changed over time, for example, due to changes in the set of available processing elements over time. A decision on whether to use a new job plan for the new inquiry or one of the previously created job plans, even though the older job plans are sub-optimal or less efficient, is made.

In one embodiment, the present invention is directed to a method for processing inquiries over continuous streams of data using sub-optimal sets of processing elements. A new inquiry to be processed over a continuous dynamic stream of data is identified along with a new job plan for execution of the new inquiry. The new job plan includes an identification of a plurality of best currently available processing elements for processing the continuous dynamic stream of data in accordance with the new inquiry. The job plan can use a single site or a plurality of distributed sites. The plurality of best currently available processing elements are capable satisfying user-defined performance criteria for processing the new inquiry over the continuous dynamic stream of data. These user-defined performance criteria include, but are not limited to, speed, accuracy, efficiency, cost and combinations thereof. The new job plan is compared to a previously executed job plan created for a previous inquiry that is sufficiently similar to the new inquiry. The new job plan, the previous executed job plan or both the new job plan and the previously executed job plan are executed to process the inquiry.

In one embodiment, a log of previous inquiries and the previously executed job plans associated with each previous inquiry in the log is maintained. Therefore, the new inquiry can be compared to a log of previous inquiries, and the previous inquiry can be identified from the log of previous inquiries such that the previous inquiry satisfies a predefined relevance metric. Suitable relevance metrics include a key word search. The previously executed job plan for the identified previous inquiry that satisfies the relevance metric is obtained. In one embodiment, differences between the previously executed job plan and the new job plan are identified and used to select at least one of the previously executed job plan and the new job plan for execution.

In one embodiment, execution of the job plans includes executing both the previously executed job plan and the new job plan. Therefore, results from the execution of the previously executed job plan and the new job plan can be compared, and the previously executed job plan or the new job plan is selected based on this comparison of results. In one embodiment, the new job plan is selected. In addition to processing the new inquiry, the new job plan is used to process the previous inquiry associated with the previously executed job plan. Therefore, the new job plan is used to create a new set of results for one or more previous inquiries. In addition to re-processing previous inquiries with a new job plan, the selected job plan, either the new job plan or previous job plan, is used to process subsequent inquiries. In one embodiment, comparison of the new job plan to a previously executed job plan further includes comparing the new job plan to a plurality of previous inquiries that are sufficiently similar to the new inquiry. At least one of the new job plan and one or more the previously executed job plans are then executed based on this comparison.

DETAILED DESCRIPTION

Figure 1:
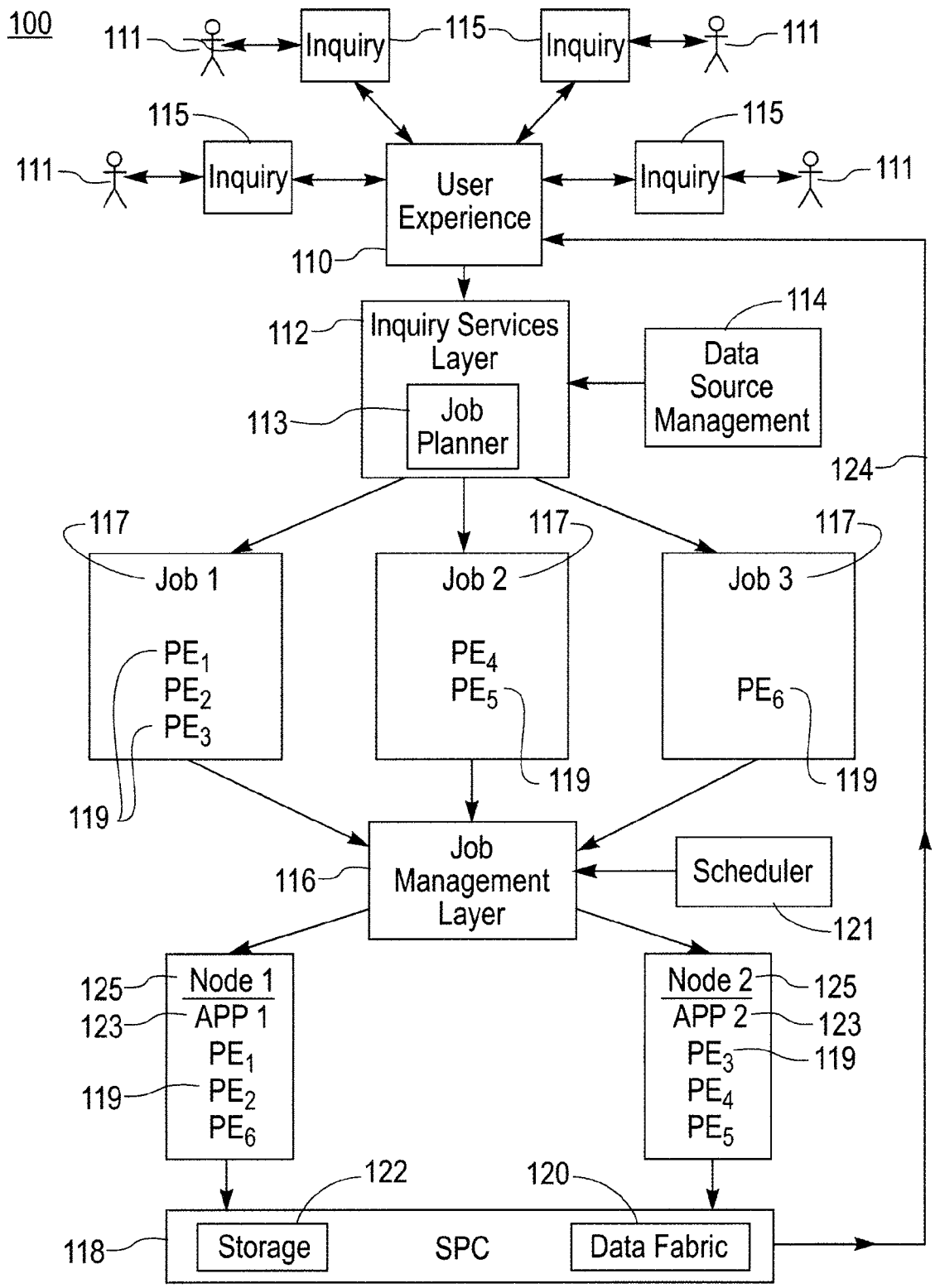
FIG. 1 is a schematic representation of an embodiment of a system architecture for use on all sites within the cooperative data processing system of the present invention.

Systems and methods in accordance with the present invention provide for the processing of inquiries over one or more continuous, dynamic streams of data in accordance with a job plan. The job plan includes an identification of processing elements that provide for the processing of the inquiry over the data streams. The processing elements can be contained within a single site or disposed in a plurality of distributed sites. When the processing elements are located in a distributed environment, the job plan is a distributed job plan. The distributed job plan also provides for the inter-cooperation of multiple, autonomous, distributed stream processing sites. A given individual stream processing site, i.e., a single site, is capable of processing a continuous dynamic flow of information that is created internally at that site or that originates from sources external to that site. Important or relevant information is extracted from a continuous stream containing voluminous amounts of unstructured and mostly irrelevant data. Processing of data streams in accordance with the present invention is utilized in analyzing financial markets, for example predicting stock value based on processing streams of real-world events, supporting responses to natural disasters such as hurricanes and earthquakes, for example based on the movement of rescue vehicles, available supplies or recovery operations and in processing sensor data. Examples of sensor data that can be analyzed include data on volcanic activity as described in G. Werner-Allen et al., *Deploying a Wireless Sensor Network on an Active Volcano*, IEEE Internet Computing, 10(2):18-25 (2006) and telemetry from radio telescopes as described in T. Risch, M. Koparanova and B. Thide, *High-performance GRID Database Manager for Scientific Data*, Proceedings of 4th Workshop on Distributed Data & Structures (WDAS-2002), Carleton Scientific (Publ), 2002.

Exemplary embodiments of data processing in accordance with the present invention provide for rapid system reconfiguration. The system adjusts quickly to the changing requirements and priorities of users and administrators. As the system adjusts, it simultaneously identifies and incorporates new input streams into its processing and manages the loss of existing data sources or processing capacity.

Data stream processing systems in accordance with the present invention function well under high load. In one embodiment, the system is assumed to be in a constant state of overload and must continually adjust its resource allocations to support the highest priority activities. Applications utilizing exemplary embodiments of the system for data stream processing in accordance with the present invention contain significant resilience to variations in processing resources, missing data and available input streams, among others. The missing data include data that is replaced by more important data as described in Fred Douglis et al., *Short Object Lifetimes Require a Delete-Optimized Storage System*, Proceedings of 11$^{th}$ ACM SIGOPS European Workshop (2004).

Exemplary systems for data stream processing that contain multiple sites are typically heterogeneous. For example, a given system for cooperative data stream processing contains a plurality of distributed sites. In one embodiment, each site is autonomous. Certain sites include substantial processing capacity, for example, thousands of processing nodes and terabytes to petabytes of storage. Other sites within the system have limited resources. Sites with limited resources may provide specialized or specific tasks such as data acquisition. Although two or more sites can be operated by a single domain or organization, each one of the plurality of sites is preferably completely autonomous and can vary significantly in execution environment, policies and goals. The extent and type of cooperation provided by each autonomous site varies based on the structure and compatibility of any given set of sites.

Cooperative data stream processing systems that include multiple cooperating sites include a stream processing core to manage the distributed execution of software components of applications, a nano-scheduler to control the traffic flow between processing elements, a storage management system to control the data to be persisted in the storage system based on retention values, a planner to assemble applications or jobs based on user requests and available software components and a security enforcement architecture. In general, the plurality of sites contained within the cooperative data stream processing systems cooperate. The resultant interactions are supported and balanced against other requirements and challenges including autonomy, privacy and security constraints and differences in execution environments among the various sites.

Cooperation among the sites takes several forms. Sites cooperate by exchanging data. Each site can pass primal data streams on to other sites that need to analyze the same input data. Primal data streams are data streams that are brought into one site from outside the system. In addition, each site can pass derived data streams on to other sites. Derived data streams are data streams that are created within a site using analysis of other streams, for example primal data streams. Sites also cooperate by sharing resources such as execution resources, software resources and hardware resource, among others, in order to handle processing overloads. Overloads result from sudden increases in the system workload or sudden decreases in available resources, for example due to partial failure of a given site. In the case of a complete failure of a given site, cooperation provides for the shifting of important processing to another site. Cooperation also provides for access to specialized resources, for example devices and services, that are unique to certain sites.

Referring initially to FIG. 1, an exemplary embodiment of an architecture 100 for data stream processing by a single site or by a plurality of sites within a cooperative system. The architecture includes a plurality of layers. This first or highest layer is the user experience (UE) layer 110. The UE layer provides the interface between the cooperative data stream processing system and users 111 of the system. Each user interacts with the system through an interface such as a graphical user interface (GUI) on a computing system in communication with one or more of the plurality of sites within the system. Through this interface, each user presents inquiries 115 to the system that the system processes through one or more primal or derived data streams using the available sites, either a single site or a plurality of cooperating sites, within the system. In one embodiment, these inquiries are converted to high-level queries. An example of a high-level query is to provide a listing containing the locations of all bottled water reserves within a hurricane relief area. The UE layer 110 is also used by the data stream processing system to deliver the query results through the UE to the requesting user.

In communication with the UE layer is the inquiry services (INQ) layer 112. The INQ layer facilitates the description of a user's job request and the desired final results in a predetermined high level language. These high level languages are used to depict the semantic meaning of the final results and to specify user preferences such as which data sources to include in or to exclude from the plan. When processing inquiries; however, the INQ layer is optional as the inquiries can be input at a low level or converted from a high level description by the system. When the system includes an INQ, the INQ layer includes a job planner 113 subcomponent. Alternatively, the system includes a job planner that is not a subcomponent of the INQ layer. The job planner determines or identifies, based on the user-defined inquiries, for example as expressed in the appropriate high level language, appropriate primal or derived data sources and processing elements (PEs) that can achieve the desired goals of the inquiry. A job contains a composition of data sources and processing elements interconnected in a flow graph. The job planner subcomponent submits the produced jobs to the job management component 116 for execution. The job planner subcomponent, in defining the jobs, takes into account various constraints, for example, available input data sources, the priority of the user-defined inquiry, processing available to this inquiry relative to everything else being produced by the system and privacy and security constraints, among other factors. Examples of suitable planner components are described in Anton Riabov and Zhen Liu, *Planning for Stream Processing Systems*, Proceedings of AAAI-2005, July 2005 and Anton Riabov and Zhen Liu, *Scalable Planning for Distributed Stream Processing Systems*, Proceedings of ICAPS 2006, June 2006.

In one embodiment, the data stream processing system includes a data source management (DSM) component 114 in communication with the INQ layer and the job planner. Since there are many possible data streams that a job can process, including both primal streams from outside the system and derived streams created within the system, the DSM component matches jobs, i.e., from user-defined inquiries or queries, with appropriate data streams. In order to match jobs with data streams, the DSM component utilizes constraints specified in the user-defined inquiries. These constraints include, but are not limited to, data type constraints and source quality constraints. The DSM component returns data source records that provide information to access these data sources. In one embodiment, the INQ layer and job planner use the DSM component to formulate job execution plans, which are then submitted to lower levels of the system.

In response to user-defined inquiries and in combination with the data source records provided from the DSM component, the job planner formulates a job plan that includes one or more jobs 117 to be executed within the system and delivers these jobs to the job management layer 116 of the system. Each job identified by the job planner subcomponent contains a plurality of interconnected PEs 119. In one embodiment, incoming data stream objects are processed by the system to produce outgoing data stream objects that are routed to the appropriate PE or to storage. The PEs can be either stateless transformers or much more complicated stateful applications. The data stream processing system through the job management layer identifies the PEs in the submitted jobs and builds one or more subjobs or applications 123 from the PEs of different jobs by linking these PEs, possibly reusing them among different subjobs, to enable sophisticated data stream mining. Therefore, even though the PEs are initially associated with a given job, the PEs are re-associated into one or more subjobs in order to facilitate the desired data stream mining. Thus, the PEs of a given job can be associated with the same subjob or with different subjobs and can run on either the same or different processing nodes 125 within the system. In one embodiment, the job management layer 118 within each site is responsible for initiating and terminating jobs through the creation and initiation of the subjobs containing the PEs of the jobs. In one embodiment, each job management layer is in communication with an optimizing scheduler 121 that allocates nodes to PEs based on criteria including priority, inter-node connectivity and bandwidth requirements. As illustrated, the job management layer is responsible for the creation and initiation of subjobs on the various nodes. Alternatively, the job planner in the INQ layer includes the functionality to define subjobs and associate these subjobs with the appropriate nodes.

The system also includes a stream processing core (SPC) 118 that manages the execution of the PEs contained within the subjobs, including the distributed execution of the PEs. The SPC includes a data fabric 120 component and a storage 122 component. The data fabric component facilitates the transport of data streams between PEs and/or persistent storage, i.e., storage 122. Therefore, data can optionally be routed to storage as needed. A nano-scheduler provides adaptive connectivity and fine-grained scheduling of communicating applications. In one embodiment, the nano-scheduler is located within the scheduler 121. The scheduler 121 is a three-tier scheduler. The first tier is a macro scheduler running at longer time scales and deciding things such as which jobs to run. The second tier is a micro scheduler running at short time scales and dealing with changes in system state. The third tier is a nano scheduler running at the finest time scale and dealing with flow variations. The storage component uses value-based retention to automatically reclaim storage by deleting the least valuable data at any given time. Results flow back 124 from PEs to the UE layer for delivery to the requesting user.

Any given site within the data stream processing system runs an instance of the system architecture illustrated in FIG. 1. Therefore, as used herein, a site is a self-contained, fully functional instance of the data stream processing system of the present invention and is capable of processing inquiries over continuous streams of date in accordance with the present invention. In one embodiment, a site runs an instance of each component of the system architecture as described above in addition to a fault-tolerant service. In one embodiment, a site is an independent and functions separately from any other site to process inquiries. In one embodiment, each site belongs to a distinct organization and has its own administrative domain, i.e., administrators who manage one site generally exercise no control over the other sites within the system. In this respect, the process of distributing cooperative data stream processing systems of the present invention among multiple sites is similar to Grid Computing. Cooperation among the plurality of sites is achieved by the sites negotiating peering relationships, for example offering resources to each other while retaining a desired level of local autonomy. In one embodiment, two or more sites within a cooperative data stream processing system that want to collaborate for a common goal and benefit negotiate and form one or more virtual organizations (VOs). The sites can be homogeneous, heterogeneous or combinations of heterogeneous or homogeneous sites.

Exemplary embodiments of data stream processing systems in accordance with the present invention are powerful processing systems capable of solving complex analysis problems. Cooperation among a plurality of distinct, distributed sites enhances the capabilities of the data stream processing system. With regard to the breadth of analysis provided by the data stream processing system, a single organization addresses a set of problems that require data analysis by processing only the relevant data that the single organization alone is able to access. However, when two organizations work in conjunction, a larger and more diverse set of data is available for analysis. This increase in the size of available data expands the range of problems that can be analyzed, improves the quality of the resulting output of the analysis and facilitates the addition of analysis types not available in a single organization. For example, a multinational financial services company might perform detailed acquisition and analysis of companies, economies and political situations within the local geographic region of each of its analysis sites. These various sites could interoperate minimally by default, but cooperate closely upon a significant event or when analysis of multinational organizations is required.

Cooperation enhances both reliability and scalability within the system. With regard to reliability, the reliability of one site is significantly improved through the use of agreements with other sites to take over key processing and storage tasks when failures occur. With regard to scalability, cooperation among sites provides increased scalability as extreme scalability cannot be achieved through unbounded growth of an individual site. The cooperation of multiple autonomous sites achieves much higher levels of scalability. In addition, cooperation across sites allows offloading of processing demands to other sites when one site experiences a workload surge. However, cooperation among multiple sites is not necessary for the processing of inquiries as a single site can be used to process inquiries over continuous dynamic streams of data.

What cooperation among multiple sites is used, the data stream processing system supports a range of distribution or peering models, ranging from basic models to sophisticated models. In one embodiment, the system is arranged to support a range of different peering models between sites. Negotiated common interest policies (CIPs) define the relationships among sites, and thereby the formation of virtual organizations (VOs). Although each VO can be a distinct entity containing an exclusive grouping of sites, different VOs may overlap with one another, i.e., may contain the same sites. Therefore, any one of the plurality of sites can participate in multiple VOs. This structure facilitates basic point-to-point, i.e., site-to-site, peering and peering between entire VOs having sites arranged in hierarchical, centralized or decentralized arrangements. For simplicity, the distribution models discussed below are described in the context of basic point-to-point interaction between sites.

In one embodiment of a basic distribution model, all processing takes place at a home site, i.e., the site performing an inquiry and making use of resources from other sites. Data source sharing is achieved by directly shipping data from remote sites across the network for processing at the home site. Shared data sources include real-time data streams and stored data. Implementing this distribution model creates the necessity for distributed data acquisition capabilities to identify and to access remote data sources and a stream processing engine that can send and receive streams remotely. One advantage of the basic distribution model is simplicity. Data from another site is used with local processing, and the amount of processing and network bandwidth resources consumed are related to the volume of the data streams originating at remote sites. Larger volumes of transferred data, however, consume more resources. Primal streams in particular consume large amounts of resources in this distribution model as these streams undergo little to no processing at the remote site to reduce their size. Derived streams may be at a more manageable data rate, presenting less of an issue, but in some cases even a derived stream is voluminous.

In another embodiment of the distributed processing model, preliminary processing of a data source is conducted at the site from which the data source originates. This arrangement addresses the issue of sending large amounts of data across the network. In addition, duplicate processing is reduced when two or more sites want to access the same data source from a third site and need to perform the same or similar processing. This approach adds complexity, however. If a data source is not already being accessed on the remote site, then processing must be initiated there on behalf of the home site, raising issues of trust between the cooperating sites, as one site is asking the other site to execute potentially arbitrary code on its behalf. The trust issue is addressed using the CIP that exists between the sites. One aspect of a CIP reflects the arrangement each site has negotiated by specifying the data sources each site is willing to share and the types of processing each site is willing to perform on the shared data sources.

Other distribution models achieve more distributed processing. In one embodiment, effective ownership of some resources in the remote site is transferred to the home site. Therefore, the scheduler located at the home site allocates those resources or processing nodes for which ownership has been transferred to the home site. This model is referred to as resource partitioning and requires a relatively high level of cooperation and trust between the remote site and the home site. In another embodiment, processing is scheduled by the remote site and includes commitments regarding the allocated resources. In this embodiment, which is effectively a service-level agreement (SLA) model, a greater degree of site autonomy is maintained. In addition, this model facilitates sharing when multiple sites want to access the same data stream.

In another embodiment of the distributed planning model the availability of both data sources and processing resources at multiple sites are considered as part of the planning process. For example, if the home site requires several data sources from a remote site, the most logical solution may be to send an entire job or subjob over to that remote site as opposed to communicating the data sources from the remote site to the home site. Similarly, a given set of PEs may be broken down and distributed among a plurality of sites according to the availability of data sources and the processing capability at each site. In order to partition a processing graph intelligently, the availability of data sources, PEs and processing resources at each site must be known. Therefore, the identification of other job components running at a specific site and how important these jobs are in comparison to the one being planned are taken into consideration. In addition, the execution of the plan is monitored closely to ensure that each site involved is operating effectively and that the overall plan is executing as efficiently as possible across the sites. Execution issues discovered via monitoring feedback can trigger re-planning of the entire job or a portion of the job.

Preferably, a combined model approach to job planning is used. This combined model approach is more complex than the models described above; however, the combined model is the most powerful model. The combined model approach receives support from several components in the data stream processing system architecture including the INQ layer and the scheduler. A higher degree of interoperability and trust between sites is utilized by the combined model approach. This higher degree of trust can be based, for example, on the CIPs for the plurality of sites within the data stream processing system. In general, however, job planning is a central feature to system-wide or region-wide effectiveness and efficiency. Multiple sites that cooperate for the good of the entire system as a whole, rather than optimizing independently and in isolation, optimize the use of resources by optimizing the subdivision and placement of jobs according to their inputs, execution patterns and priorities, among other factors.

In one embodiment, an increased level of integration is provided by situating a given instance of the job management layer and scheduler to encompass multiple sites. Therefore, this instance of the job management layer and the scheduler optimize multiple sites concurrently, treating these sites as a whole. This increased level of integration requires the greatest amount of interoperability and trust between sites. Depending on the degree of integration, sites can be either cooperative, in which the sites work toward certain common goals but retain a significant amount of autonomy, or federated, in which sites subordinate to a single lead site. In one embodiment, the integration arrangement among the sites is expressed in the CIPs.

As was discussed above, when two or more sites located within the data stream processing system of the present invention agree to interoperate to achieve common or distinct goals that the sites were are unable to achieve in isolation, the sites form a VO. An example of forming VOs is described in Ian Foster, Carl Kesselman and Steven Tuecke, *The Anatomy of the Grid: Enabling Scalable Virtual Organizations*, Lecture Notes in Computer Science, 2150 (2001). In forming a VO, the member sites agree, i.e., negotiate, on inter-operational terms. These negotiated terms are formulated into a CIP for that VO. As member sites of a given VO, each site shares various types of data and processing resources in accordance with the CIP.

In defining the interactions among the member sites, each site agrees to a predetermined style of interoperation for the VO, i.e., cooperative or federated. A federated VO includes an appointed lead site for the VO. The lead site assumes a coordination role and is able to exert a level of control over the other sites. Federated VOs function best when the member sites share a common set of goals. The lead site is able to optimize resource and processing usage to support the common good of the VO or at least the good of the lead site. A cooperative VO lacks a central point of authority. The VO members interact as peers. Each member site is independent of the other sites and may have a separate agenda. However, the member sites recognize that operating in a cooperative manner increases the overall fulfillment in each independent goal.

In general for all VOs, the CIP includes the terms and conditions governing the interoperability among the plurality of member sites of the VO. In one embodiment, the CIP identifies the data streams and locally stored data that are shareable via remote access. This identification includes identifying classes of data streams and other data based on their attributes, since it may not be possible at the time the CIP is created to predict the data streams and other data that will exist in the future. A given CIP references the classes within the terms for that CIP. For example, a given data stream is tagged globally public, locally public or private, and a CIP term is created that grants read accesses for all globally public streams. As another example, a data stream is tagged as coming from a publicly accessible sensor, e.g., a traffic camera, and the CIP contains a term that states that public sensors are freely shared. In one embodiment, a CIP term is general and specifies that any data source located in a particular location, e.g., city, is shared, without such explicit tagging.

The CIP also includes terms to identify processing resources that are sharable. These terms identify member sites that support remote inquiries and, therefore, support a distributed planning interaction model. In addition, these terms identify member sites that only support the distributed processing and distributed data source interaction model. In one embodiment, the CIP terms identify the types of raw processing resources that are available to be shared. Suitable processing resources include, but are not limited to, central processing unit (CPU), memory, storage, software and hardware including special processing hardware. The types of available raw processing resources identify the VO as supporting the resource partitioning model, the SLA-based model or both models. The CIP terms can also identify the member sites that are available to assist in failure recovery processes and the degree of assistance available from each one of these member sites.

The processing resources within the VO can be offered to all member sites of the VO. Alternatively, the processing resources are offered to only a subset of the member sites, as specified in the terms of the CIP. In one embodiment, anything that is not explicitly offered in a CIP is not allowed. By specifying these terms in the CIP, each VO member site is advertising resources that another VO member site may request to use. However, the ability of other member sites to actually use these resources is not guaranteed. Some resources are limited in nature, and, therefore, the site providing these limited sources may not be able to satisfy all requests from all consumer sites, at least not with the quality of service that the consumer sites expect. Therefore, in order for a VO member site to reserve an exclusive use of the limited resource, this member site establishes an agreement with the providing member site. This agreement is used in both the SLA and resource partitioning model described previously.

In addition to defining the set of agreements that are possible in a VO, the CIP specifies the particulars that are available for an agreement, for example the quality of service levels, costs and limitations on the resource usage. Once established, a given resource agreement is referenced every time a request is made for that resource. The terms and conditions of the agreement, in addition to the costs and penalties, are continuously monitored by auditing functions located at both sites that are members to the agreement, i.e., the sites providing and consuming the resource.

In the data stream processing system of the present invention, the CIPs provide the creation templates that are used to create agreements between the provider and the consumer of the resource to be shared. These templates are used to create an actual agreement to access particular resources over a specified time interval. In addition, the CIPs define higher-level business interaction schemes between VO member sites. For example, the stakeholders of a given site can specify in the CIP not only the types of possible interactions between the VO member sites, but also the conditions under which agreements can or cannot be established. CIP terms are made within a VO-wide context and not just in the context of two member sites. In addition to describing the interoperation terms between member sites regarding resource sharing, the CIP also contains the technical communication details that are necessary to establish the communication channels among the various member sites. In one embodiment, the member sites that are members of a given VO are heterogeneous, for example having different data formats and security labels. To overcome issues related to handling heterogeneous systems, the CIP contains information regarding the kind of environment mapping required in order for the various types of sites within the VO to communicate.

Each site within the data stream processing system is not limited to being a member of only one VO. A given site can be a member site in a plurality of different VOs, both federated and cooperative. However, although member sites of a given VO interact and cooperate, member sites of different VOs are not allowed to interact directly with each other. If a given site attempts to use resources from multiple VOs, that site must act as a common point of contact to bridge data from one VO to another VO. Alternatively, that site can interact separately with each VO, merge the results internally and present the merged results to the user, subject to the constraints in the multiple VOs' CIP terms as agreed.

In one embodiment, a given VO can join as a member of another VO, forming a hierarchical VO structure. The joining VO honors any interoperation terms that are expressed in the CIP of the VO to which it joins. The joining VO uses the resources of its member sites resources to fulfill requests in accordance with the interoperation terms. How the member sites of the joining VO are used depends upon the type of VO. For a federated VO, the VO lead site delegates requests to the joining VO member sites as the lead site determines is appropriate. A cooperative VO that joins as a member of a larger VO requires extensive negotiation to specify in the CIP how the member sites of the cooperative VO can be used.

Figure 2:
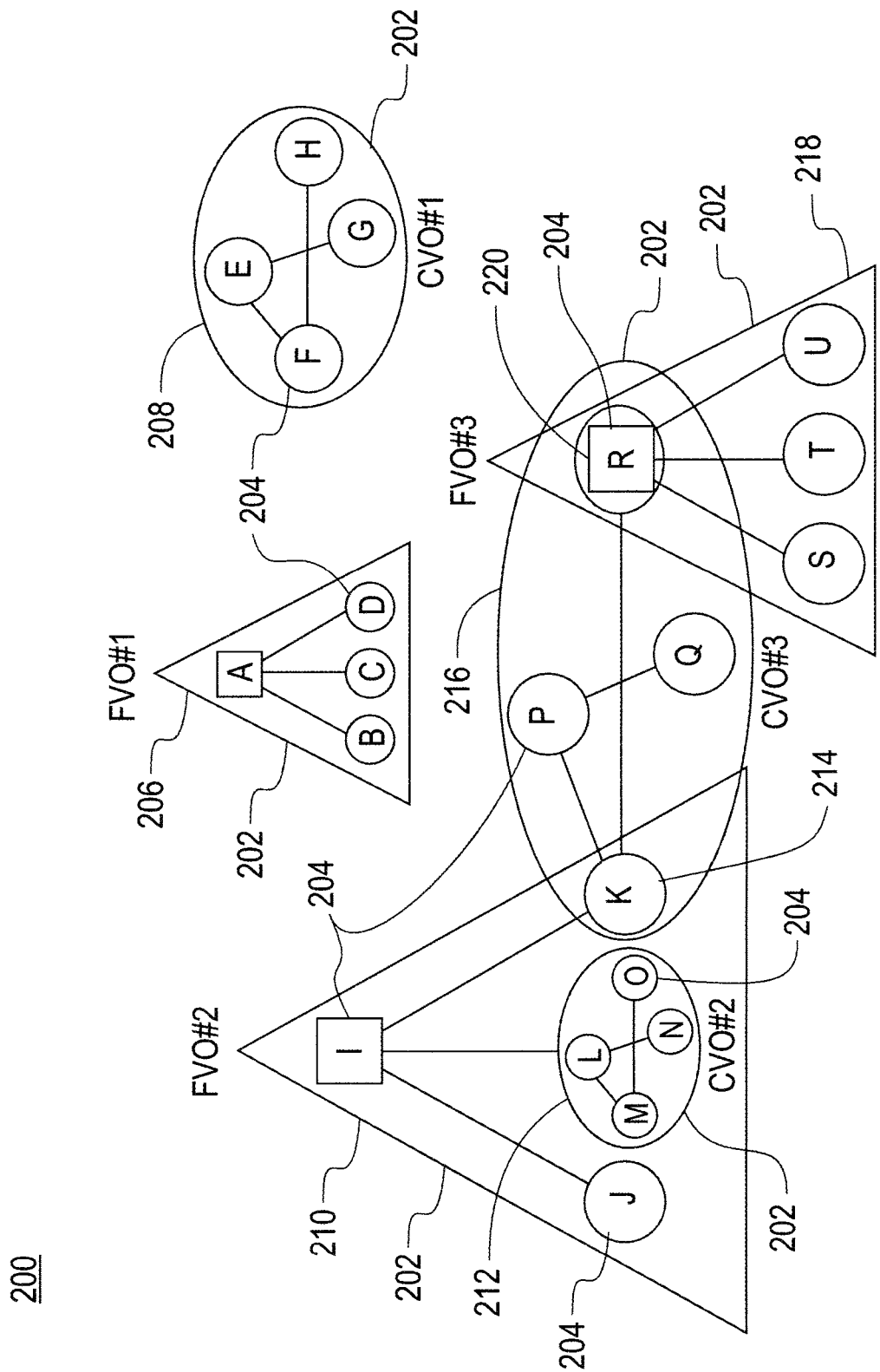
FIG. 2 is a schematic representation of an embodiment of peering relationships among sites within the cooperative system.

Referring to FIG. 2, an exemplary embodiment of a complex VO structure 200 in accordance with the present invention is illustrated. As illustrated, triangles represent federated VOs, and ovals represent cooperative VOs. Individual member sites are represented as circles, and federated lead sites are squares. The structure includes a plurality of VOs 202, and each VO contains a plurality of member sites 204. One of the plurality of VOs is an isolated federated VO 206 (FVO#1), and one of the plurality of VOs is an isolated cooperative VO 208 (CVO#1). Since the member sites in these VOs are not members of any other VOs, the only sites they are able to interact with are the other members of that same VO. For example, site A is only able to interoperate with sites B, C, and D. A second federated VO 210 (FVO#2) contains three member sites, lead site I and participant sites J and K. In addition, the second federated VO 210 includes a member that is itself a cooperative VO 212 (CVO#2). One of the member sites 214 (K) is also a member site of a cooperative VO 216 (CVO#3). This cooperative CO also includes three other member sites. Another federated VO 218 (FVO#3) is provided having four member sites, and the lead member site 230 (R) is also a member site of one of the cooperative VOs 216.

These mixed and overlapping hierarchical VO structures allow very complex structures to be created. Care is taken in constructing these structures to avoid creating operational issues. For example, the second cooperative VO 212, while organized as a cooperative VO, is joined to a federated VO 210. Therefore, the member sites of the joining cooperative VO agree to some degree to a higher level of control from the lead member site of the federated VO. Therefore, when a VO, either cooperative or federated, joins another VO, all member sites are involved in the decision as the decision affects all the member sites. In general, joining a cooperative VO causes less impact on the joining member sites, because the joining members retain a high degree of individual control. When a federated VO lead site 220 joins a cooperative VO 216, that lead site maintains a high degree of flexibility in delegating work to member sites in the federated VO, since the lead site retains control over the members of the federated VO. This ability of a lead site to delegate or off-load responsibilities enables the lead site to re-mission its resources to better fulfill any requests imposed on it due to its membership in the cooperative VO. Because the member sites (S, T, U) in the federated VO (FVO#3) are not in the cooperative VO (CVO#3) like the federated VO leader site, these sites are not able to interact directly with the other members of the cooperative VO (CVO#3) and must interact via the federated VO leader site (R).

Although sites and VOs may be members of multiple VOs simultaneously, they are not allowed to join a VO if this would cause a conflict with their existing peering relationships. For example, if a site is a member of a VO that requires it to share a given resource with a second site, that site is not allowed to join another VO that prohibits the sharing of this same resource with the same site, unless that site withdraws from the first VO. In one embodiment, a given site can choose which terms it wants to adhere to and which VO it wants to join.

As used herein, resource awareness refers to the discovery and retrieval of information about data sources, PEs and other kinds of resources, for example execution resources and active inquiries, among multiple collaborating sites. A site stores information about such resources in relational or semantic data stores. In one embodiment, the instance of the data source management component on the site maintains low-level characteristics, e.g., delays and data rates, about data sources in a relational database and semantic descriptions in a semantic metadata store. The component that provides the discovery and retrieval of information about remote resources is the resource awareness engine. The resource awareness engine is in communication with the other components on a the site and is used by these components to retrieve desired information. For example, if a job planner needs to know the kinds of data sources and PEs that are available at remote sites in order to produce global plans that utilize resources in a VO, the job planner uses the resource awareness engine to access such information about other sites. The same applies to PEs and other kinds of resources as well.

The resource awareness engine provides a layer of indirection between endpoints. For example, a store or a client does not need to interact with the other end directly. The ability to eliminate the need for interaction between endpoints is particularly beneficial when there are many endpoints. The resource awareness engine provides a universal interface that endpoints use to communicate, and the resource awareness engine conceals underlying complexities and dynamics so that the endpoints always see the same interface. The addition or withdrawal of any site is handled by the resource awareness engine and becomes transparent to each client.

The resource awareness engine provides two kinds of interfaces. The first interface is a search interface, which is the "pull" mode of resource discovery. A client sends a query to the resource awareness engine, specifying the resources that are requested. The resource awareness engine searches multiple sites and returns matching resources from multiple remote sites. The second interface is a publish/subscribe interface, which is the "push" mode of operation. Sites having resources to advertise and share with other sites publish the information to the resource awareness engine. Sites requiring resources subscribe to the resource awareness engine and specify the resources needed. The resource awareness engine actively pushes matching resources to the requesting sites. These two interfaces fulfill different needs within the system. The "pull" mode interface is suitable for clients, for example the failover site selection component, that request dynamically changing resources once in a while, only upon infrequent events, e.g., site failures, and only requiring the most up-to-date information. The "push" mode interface is suitable for clients, for example the planner, that want to keep updated about continuously changing information, not just current but also past information. This interface keeps the client up to date about variations. A client may use a combination of "pull" and "push" interfaces for different types of resources as well.

Two different engine components in the resource awareness engine interact with system endpoints. These components are the exporter component of the resource awareness engine and the importer component of the resource awareness engine. The exporter component is responsible for interacting with a resource store that has data to publish or that is willing to accept external queries. The exporter component receives resources advertised by the store and relays these resources to the importer component. Alternatively, the exporter component receives queries from importer components, forwards these queries to the resource store and returns results. The importer component interacts with sites that request resources. The importer component receives queries from the sites and relays these queries to the exporter component. Alternatively, the importer component accepts subscriptions from sites and actively pushes matching resources back. In one example of data source discovery using the resource awareness engine, an existing single site component manages resource stores. When a client, for example a distributed planner, needs to discover remote data sources, the client sends a query to its local importer component. The importer component checks the CIP to identify sites that it can search. The importer component forwards the query to the exporter component of the identified sites. The exporter component checks the CIP to ensure the requesting site is allowed to access the resources. If so, the exporter component forwards the query to the Data Source Manager (DSM) component, which returns the results. Eventually the matching data source records are returned to the client.

Remote data sources can also be located using the push mode of operation of the resource awareness engine. For example, remote sites actively publish information about data sources through their local exporter components. The distributed job planner, or the DSM component that acts on behalf of the job planner, sends a subscription to its importer component. The importer component notifies other exporter components. Whenever matching data sources are published, exporter components actively push the matching data sources to the importer component and eventually to the client.

In one embodiment, the resource awareness engine provides the "pull" mode resource discovery by organizing the resource awareness engine components located on multiple sites into an overall hierarchy. The resource awareness engine component of each site chooses the resource awareness engine of another site as its parent. The two sites collectively form a tree structure. The hierarchy of the tree structure can naturally follow existing administrative relationships within an organization that owns multiple sites. This hierarchy can be used in a federated VO. Organizational peers, which are not subordinate to each other, negotiate among themselves and determine the hierarchy formation. This hierarchy formation is done in a cooperative VO. The exporter component at each site summarizes its resources, e.g., data sources, in aggregated forms and sends the summary to the importer component of its parent site. The aggregate resource summary is a condensed representation of the original resources, e.g., data source records, and supports attribute-based searching. The aggregate resource summary can take many different forms. For example, a histogram form can be used to summarize the DATA-RATE attributes of the video data sources of a site. Multi-resolution compression techniques can be used as well. A description of multi-resolution compression techniques is given in Deepak Ganesan et al., *Multi-resolution Storage and Search in Sensor Networks*, ACM Transactions on Storage, August 2005. The importer component of a parent site further aggregates the summaries from its children sites and sends these summaries up the hierarchy. Therefore, summaries are aggregated and propagated bottom-up through the hierarchy. The root resource awareness engine has a global summary of all the resources within the hierarchy, and each site has a branch summary of resources owned by its descendants.

The discovery of data sources initiates in the root resource awareness engine. An importer component from a client site sends a request to the importer component of a root site. The root site examines its own resources and the summaries of the resources of its children. The root site returns its eligible resources to the client and instructs the client to search the child branches of the root site that contain matching summaries. Through this mechanism, the client discovers eligible resources from all sites. In one embodiment, replication overlays are used to eliminate potential performance and failure bottlenecks at the root importer component.

The "push" mode of the resource awareness engine uses a semantic pub/sub system that matches events to subscriptions. Events are the semantic description of advertised resources in resource description framework (RDF) triples. Each triple has a subject, a predicate and an object and describes the relation between the subject and object. For example, Camera 51 locatedIn NY indicates "Camera 51" is located in "NY". A set of these triples can represent the semantic information of resources such as data sources. Subscriptions are RDF triple patterns. The RDF triple patterns are similar to triples, but some elements can be variables. ?x locatedIn NY represents any subject "?x" that is located in "NY". The semantic matcher receives events for resources from exporter components and subscriptions from importer components. The semantic matcher uses a semantic reasoner to deduce facts from ontologies, which contain formal representations of domain knowledge such as the location relationship of all cities and states in the U.S., and decides which events match to which subscriptions. An example of a semantic reasoner is described in J. Zhou, L. Ma, Q. Liu, L. Zhang, and Y. Yu. Minerva, *A Scalable Owl Ontology Storage and Inference System*, The First Asian Semantic Web Symposium (2004).

Figure 3:
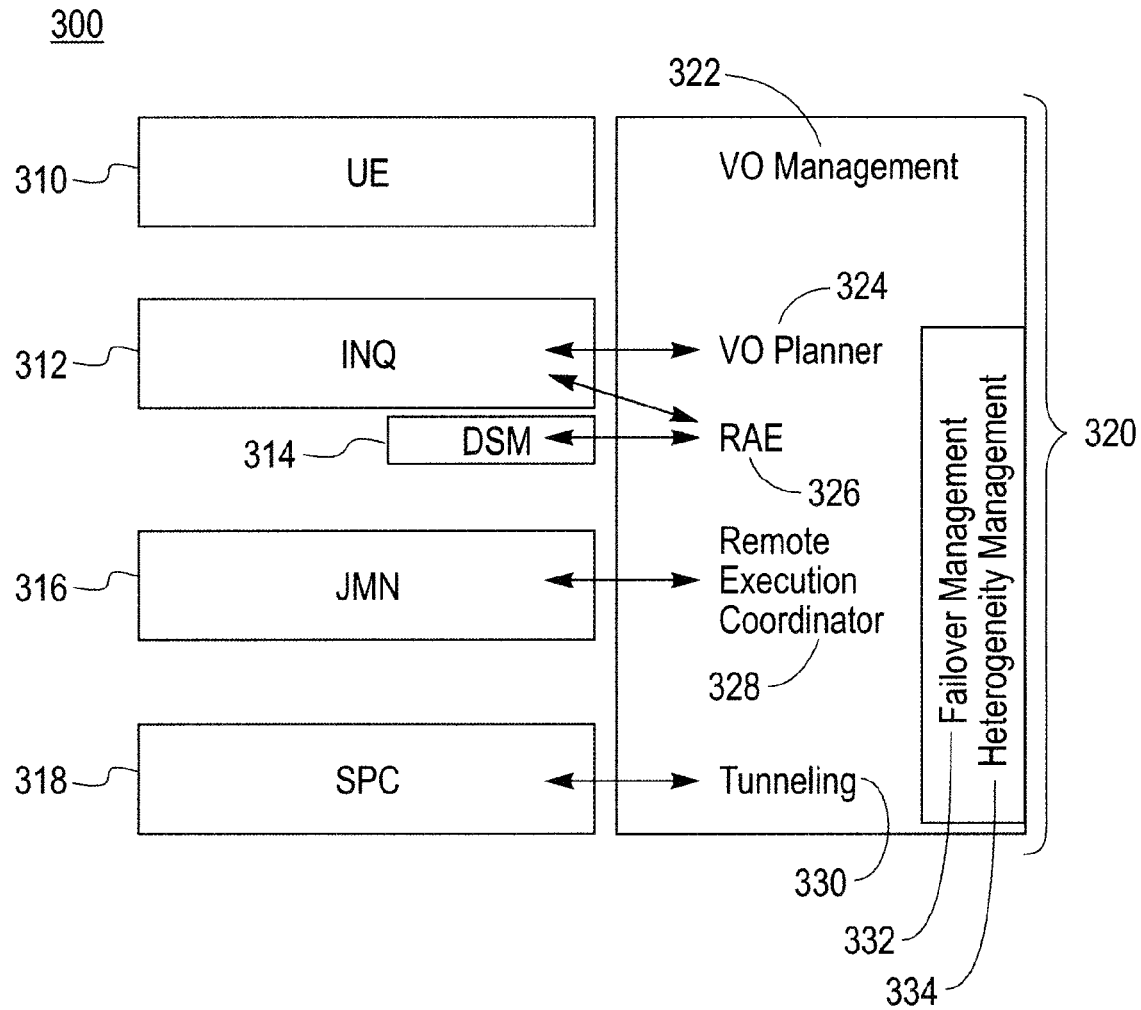
FIG. 3 is a schematic representation of the system architecture in combination with an embodiment of multi-site system functions.

Referring to FIG. 3, an exemplary embodiment of the functions that facilitate cooperation in combination with the system architecture 300 is illustrated. The plurality of functions 320 supporting cooperation are aligned with the architectural components to which each function relates. In one embodiment, each site runs an instance of each component of the architecture and employs the set of functions as illustrated.

A first function is VO management 322, which is utilized by the user experience component 310. VO management has the greatest degree of direct interaction with end users, for example site administrators. Included within VO management are CIP management for activating, deactivating and maintaining CIPs, VO membership management for tracking which sites are in a VO and the roles of each site within a given VO, agreement management for enacting agreements with other sites and VO services including accounting and SLA monitoring. Administrators for each site and each VO interact directly with VO management to create and update CIPs.

The plurality of functions also includes a VO planner 324 that works with the INQ component 312 to facilitate inter-site planning. The VO resource awareness engine (RAE) provides information about available resources and interacts with DSM 314 as well as the INQ component 312. The remote execution coordinator (REC) 328 extends JMN layer 316 to the multi-site case by supporting distributed jobs. The tunneling function 330 extends the data fabric component of the stream processing core (SPC) 318 across sites by transmitting data from a PE on one site to a PE on another. In addition to functions that integrate with one of the layers in the system architecture, the plurality of functions 320 also includes functions that interact with multiple components in the core, i.e., single-site, architecture. The VO failover management (FM) 332 handles backup site arrangements, check pointing and recovery after failure. In addition, VO FM 332 incorporates heartbeat management (not shown) for tracking the availability of sites. The VO heterogeneity management (HM) 334 function manages the mapping and translation for types, schemas, ontologies and security and privacy labels, among others.

The components and associated functions illustrated in FIG. 3 are replicated on any given site within the system. In addition, the various components can appear as either a participant or a lead within a VO. Participants interact with other components on a site and relay various requests to the leads for processing. For example, in a federated VO, a federated plan lead component takes an inquiry, builds a distributed plan and invokes appropriate components on each participating site to deploy that part of the plan.

Figure 4:
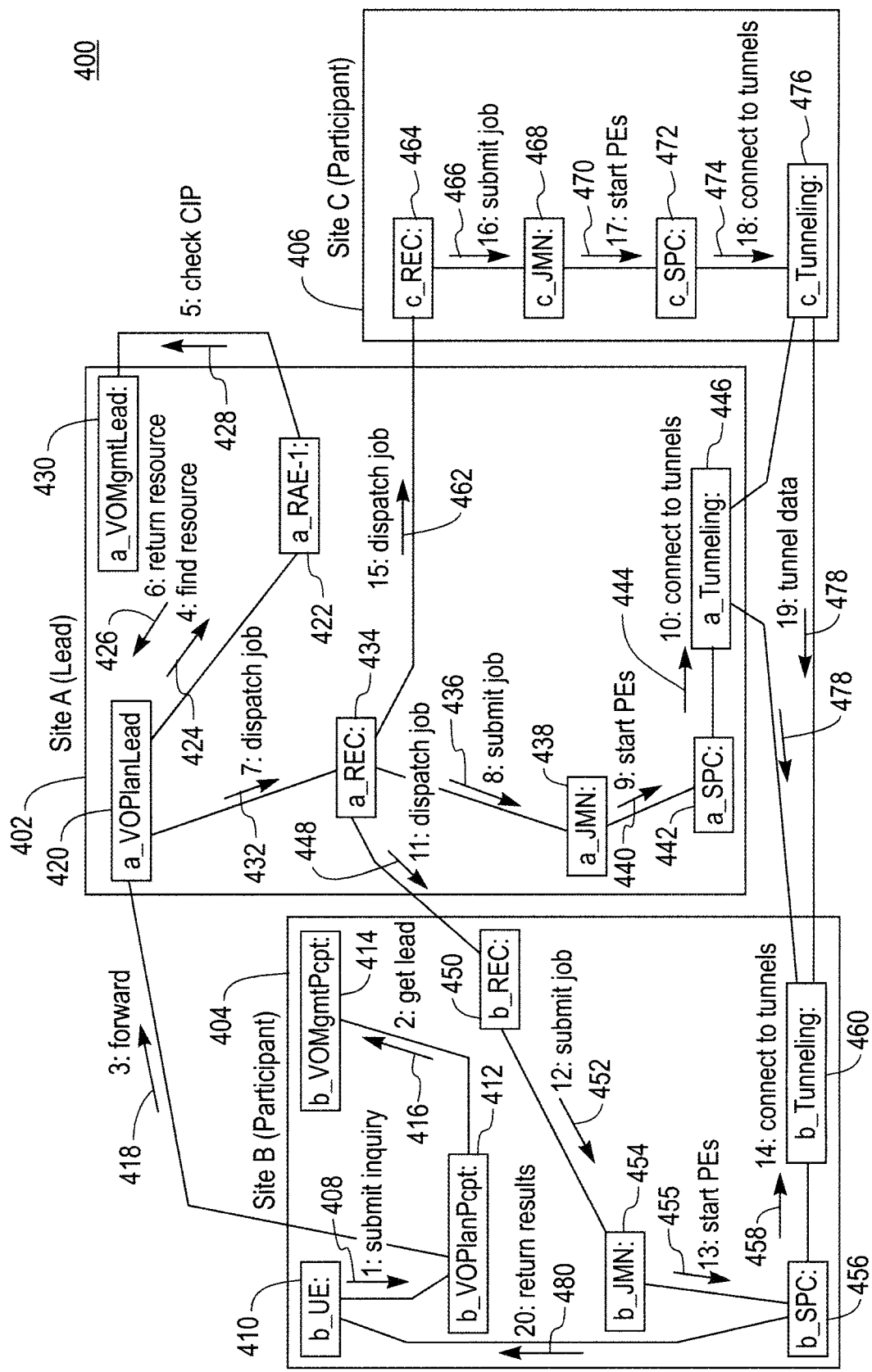
FIG. 4 is a schematic representation of an embodiment of inquiry processing using the cooperative data processing system of the present invention.

Referring to FIG. 4, an exemplary embodiment of a distributed planning scenario 400 within a federated VO using SLAs in accordance with the present invention is illustrated. The federated VO includes a lead site 402, a fist participant site 404 and a second participant site 406. An inquiry 408 is submitted from the instance of the user experience (UE) component 410 on the first participant site 404 and is received by the instance of the VO plan participant 412 on the same site. The VO plan participant 412 obtains from the VO management participant the identification of a plan lead 416 for the submitted inquiry and forwards the inquiry 418 to the VO plan lead 420 on the lead site 402. The VO plan lead examines the inquiry and sends a resource request 424 to the VO RAE-I 422 for information about where appropriate resources are available. The VO RAE-I 422 sends a request to check the CIP 428 to the VO management lead 430 to determine whether the CIP allows particular resources to be shared. The VO RAE-I 422 returns a list of appropriate resources 426 to the VO plan lead 420. The appropriate resources are available for use for plan inclusion. From this list of possible resources, the VO plan lead 420 chooses providers for needed resources, and dispatches the job 432 to the remote execution coordinator (REC) 434 on the lead site 402. The REC 434 on the lead site recognizes and separates the portions of the job that are destined for execution on other sites within the VO. The job portion that is destined for execution locally on the lead site is submitted to the local JMN 438 for execution. The local JMN 438 starts the PEs 440 using the local SPC 442 on the lead site. These PEs are connected to the tunnels 444 using the tunneling function 446 local to that site to return SDOs to the sites accessing them. Some of the above described details may vary in other embodiments. For example, a DSM component may send resource requests on behalf of the VO plan lead to retrieve data source information, and the VO plan lead asks its DSM for both remote and local data source information.

A similar job submission sequence is repeated once for each remote or participant site. For the first participant site, the REC 434 on the lead site 402 dispatches the appropriate the job portion 448 that is destined for execution on the first participant site 404 to the REC 450 on the first participant site. This REC submits the jobs 452 to its local JMN 454 for execution. The local JMN 454 starts the PEs 455 using the local SPC 456 on the first participant site. These PEs are connected to the tunnels 458 using the tunneling function 460 local to that site to return SDOs to the sites accessing them. Similarly, for the second participant site 406, the remote execution coordinator (REC) 434 on the lead site 402 dispatches the appropriate the job portion 462 that is destined for execution on the second participant site 406 to the REC 464 on the second participant site. This REC submits the jobs 466 to its local JMN 468 for execution. The local JMN 468 starts the PEs 470 using the local SPC 472 on the second participant site. These PEs are connected to the tunnels 474 using the tunneling function 476 local to that site to return SDOs to the sites accessing them. The SDOs are tunneled 478 as they are produced through to the site originating the inquiry. The SPC 456 on the first participant site, i.e., the site originating the inquiry, returns results 480 to the user as the results are obtained.

In one embodiment, a site contains a single instance of the components of the architecture of the data stream processing system so that a single site can receive and process inquiries over continuous dynamic streams of data. In one embodiment, a given site, in order to support distributed operation, includes a site server, a VO manager, a failover manager, a job manager proxy and a tunneling manager. The VO manager manages the sites that are available to play monitoring and backup roles in support of the distributed job plan. In addition, the VO manager manages agreements between sites. The failover manager chooses the specific sites to assume monitor and backup roles and orchestrates the monitoring and notification of site failures between the sites. The job manager proxy is a wrapper around the JMN component of the cooperative data stream processing system, allowing jobs to be invoked remotely from other sites. The tunneling manager provides the mechanism to transport data streams between sites.

In one embodiment, a job plan is interpreted by a site that will drive the execution of the plan and that will act as the plan owner. This site can be a single independent site, a lead site in a federated VO or a peer site in a cooperative VO that has taken on a leadership role for this distributed job plan. The set of sites that will function as the job execution sites are specified in the job plan. The job execution site can be a single site or a plurality of sites. Next, the monitoring sites that will monitor the health of the job execution sites are chosen, if desired. This selection can be hard programmed into one or more sites or can be selected, for example using the VO manager located on the plan owner site. This VO manager checks for sites that are willing to provide monitoring capability according to the CIP associated with the VO. Specific sites are chosen through interaction between the failover manager on the plan owner site and failover manager counterparts on other sites. Agreements to monitor are created between the plan owner site and the VO managers of the monitoring sites. The selection of job backup sites that take over the execution of critical jobs upon a site failure is made through methods similar to the selection of monitoring sites. In one embodiment, the selection of backup sites is made ahead of time in advance of a site failure. Alternatively, the selection is deferred until a failure occurs, and backup sites are chosen on demand. Agreements to backup are also obtained from these sites.

Figure 5:
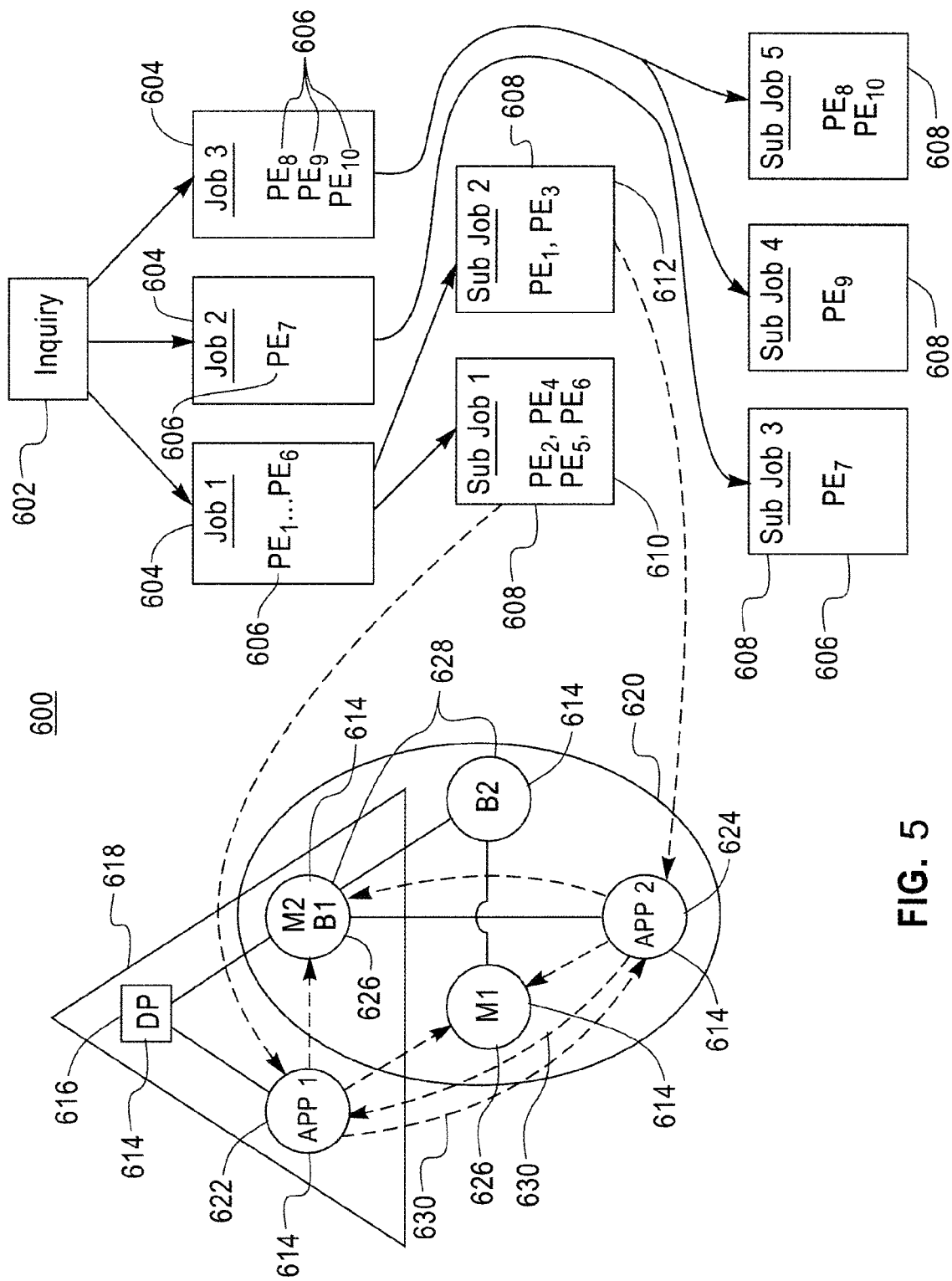
FIG. 5 is a schematic representation of an embodiment of the deployment of a distributed plan for the execution of jobs in the cooperative data stream processing system of the present invention.

In one embodiment, the present invention provides for the distributed execution of jobs across the plurality of distributed sites in the data stream processing system. In this embodiment, each job corresponds to one of a plurality of job plans that are derived from a user-defined inquiry submitted at or through one of the plurality of sites within the system. A given job contains a plurality of subjobs, and each subjob is deployed to and executed on one of the plurality distributed sites within the system. Therefore, a given job, i.e., distributed job plan, derived from a user-defined inquiry is executed on multiple sites within the system. From each inquiry at least one job plan, and preferably a plurality of job plans, is provided that contains the requirements for the distribution and execution of a job across the plurality of distributed sites within the data stream processing system. Each job plan describes how a job is divided up into individual subjobs, which can also be described as applications, that are deployed to and executed on the different sites. Referring to FIG. 5, an exemplary embodiment of the use of a job plan 600 for the execution of jobs across a plurality of distributed sites is illustrated. The job plan can also be used to execute one or more jobs on a single site. From a given user-defined inquiry 602, a plurality of job plans is derived. Each job plan translates into a job, resulting in a plurality of jobs 604 from the user-defined inquiry. Each job plan provides for the identification of the processing elements 606 that constitute the job associated with that plan. In accordance with the job plan, these processing elements 606 are arranged into a plurality of subjobs 608 for deployment on one or more of the distributed sites 614 within the data stream processing system. The job plan defines subjobs in accordance with the processing and data stream requirements of each processing element and the processing and data stream resources located at each distributed site.

In general, each one of the plurality of distributed sites contains a single, independent instance of the components of the data stream processing system that make it possible for each site to independently execute applications deployed to that site. These components include a site server, a remote execution coordinator (REC), a VO manager, a failover manager, a job manager proxy and a tunneling manager. The site server facilitates messaging between sites and brokers the components of a given local site to remote site clients. The REC is used to implement most of the distributed execution logic for the applications deployed on the site. The VO manager provides a variety of services including managing the sites that are available to provide monitoring and back-up roles in support of the job plan and managing agreements between sites in support of these monitoring and back-up roles. The failover manager identifies and selects the specific sites to provide monitoring and back-up support and orchestrates the monitoring and notification of site failures between the sites. The job manager proxy, which in one embodiment is a wrapper around the JMN component of the data stream processing system, allows jobs to be invoked remotely from other sites. The tunneling manager provides the mechanism to communicate data streams between processing elements running on different sites.

In order to provide for the execution of subjobs across the plurality of sites, each identified job plan is communicated to a given site 616 within the system. This site is referred to as the owner site for the job plan. The owner site interprets the job plan and drives the execution of the plan, acting as the owner of the job plan. In one embodiment, as illustrated, the owner site is a lead site in a federated VO 618. However, the owner site can also be a peer site in a cooperative VO 620 that has taken on a leadership role for the job plan. The job plan identifies a plurality of sites within the system for the execution of subjobs. These sites are referred to as execution sites. The job plan maps the subjobs to the execution sites. As illustrated, the job plan identifies a first execution site 622 to which a first subjob 610 has been mapped for execution and a second execution site 624 to which a second subjob 612 has been mapped for execution. As illustrated, only two execution sites and two subjobs have been identified; however, any number of execution sites and subjobs can be specified in the job plan in accordance with the user-defined inquiry from which the job plan is derived. The owner site and execution sites, as well as any other supporting sites such as monitoring and back-up sites are in communication in accordance with the requirements and limitations of the VO's to which these site belong. In general, these sites do not interact in ways that are not permitted by the CIP specification for the VO to which the sites belong. In one embodiment, the CIPs allow the necessary interactions between sites to facilitate execution of the job plan.

In one embodiment, execution of the job associated with a given job plan is driven by the REC on the owner site 616. If the owner site is not in communication with one or more of the job execution sites, 622, 624, initial contact is made through the site servers located on the execution site, using, for example, information from the CIP.

In addition to providing for the identification of processing elements from the jobs, the associating of these processing elements into subjobs, the mapping of those subjobs to execution sites and the delivery and deployment of the subjobs on the execution sites, each job plan can provide for the monitoring and failover support of the execution sites in accordance with the data stream processing system of the present invention as described herein. In one embodiment, the job plan provides for the identification and selection of one or more monitoring sites 626 and one or more back-up sites 628 for each execution site. Alternatively, specification of the monitoring sites and back-up sites are not included in the job plan. In general, the failover manager identifies and selects monitoring sites and back-up sites. The monitoring and execution sites can be the same sites or different sites, and a given monitoring or back-up site can be used to monitor or back-up one or more execution sites. In one embodiment, the failover manager on the owner site determines the monitoring sites by checking which sites in the VO are willing to provide monitoring capability according to the VO's CIP. The failover manager queries the VO manager for potential candidate sites for monitoring and back-up. The VO manager returns a list of candidate sites, and the failover manager selects from this list. Selected sites are secured through interaction between the failover manager on the owner site and the failover manager counterparts on the selected sites.

Having identified monitoring sites, agreements to monitor are created between the owner site and the VO managers of the sites providing the monitoring. The back-up sites that will take over the execution of critical subjobs upon a partial or complete site failure are also chosen in accordance with the steps used to identify, select and secure monitoring sites. Agreements between sites for back-up support are also obtained. In one embodiment, the selection of back-up sites is made in advance in accordance with the job plan. Alternatively, selection of the back-up sites is done on demand after an actual occurrence of a failure. In one embodiment, the job plan provides for the identification and selection of one or more monitoring sites 626 and one or more back-up sites for each execution site. Alternatively, identification and selection of the monitoring sites and back-up sites are not included in the job plan. In general, the failover manager identifies and selects monitoring sites and back-up sites.

Having identified the subjobs, mapped the subjobs to execution sites and provided for monitoring and back-up of the execution sites, the subjobs are deployed to the executions sites for execution in accordance with the job plan. In one embodiment, in order to prepare for the execution of subjobs in accordance with the distributed job plan, heartbeat monitoring is initiated by the failover managers on the appropriate monitoring and execution sites. In addition, the tunneling managers on the appropriate execution sites are alerted to prepare for tunneling. Because the job plan has broken up the logical plan into disjointed fragments, the tunneling requirements tell the tunneling managers how to establish tunnels 630 between PEs on the respective execution sites in order to exchange data streams between the PEs. In one embodiment, separate and distinct jobs, i.e., jobs that support tunneling, are running on behalf of the tunneling manager on each execution site involved to provide the necessary tunneling support. A set of tunneling requirements that are part of the specification of the job plan are communicated to execution sites and in particular to the tunneling managers on the execution sites. The tunneling manager on each execution site uses the tunneling requirements to configure an end of the tunnel as needed to support the execution of the job plan.

The subjobs derived from the jobs that implement the job plan are deployed to the execution sites to which the subjobs where mapped in accordance with the job plan. In one embodiment, deployment is accomplished by sending JDL to each one of the plurality of execution sites. The REC on the owner site interacts with the REC on each of the execution sites to which subjobs have been mapped to deploy the subjobs, and hence the job from which the subjobs were derived. In one embodiment, the REC performs additional processing on the job plan description, depending on how the job plan is specified. For example, some detailed configuration of each subjob, such as which PE runs on which host can be configured by the REC on each execution site before deploying the subjob. In addition, other types of configurations, such as determining exactly which data source to use, based on the current characteristics of data sources, is possible. Upon successful initiation of the subjobs, execution of the job plan begins. Data flows between PEs on each execution site, and the PEs perform the prescribed analysis on the data streams. Data streams also flow from PEs on a first execution site through one or more tunnels to other sites and are routed to the appropriate PEs on the destination site. Although illustrated with a single job plan and a single inquiry, methods for the distributed execution in accordance with the present invention can be used with a plurality of job plans derived from one or more inquiries. These job plans are deployed and executed concurrently by the data stream processing system.

In accordance with one exemplary embodiment, the present invention is directed to systems and methods for identifying and selecting a sub-optimal set of processing elements from the data stream processing system to process a user-defined inquiry over one or more continuous dynamic streams of data. Typically, the job planner in the data stream processing system automatically determines the best configuration of currently available processing elements to process a user-submitted inquiry over continuous dynamic streams of data. The best available set of processing elements are selected based on predefined performance factors including the speed of processing the inquiry, efficiency, accuracy and cost, among other factors. The processing elements available within the data stream processing system change over time as new processing elements are added or existing processing elements are upgraded or improved. As new inquires are received, the job planner selects the best currently available processing elements even though a newly submitted inquiry may be similar to or the same as a previously submitted inquiry for which the job planner previously created a job plan.

However, the selection of a set of processing elements that yield a less efficient, more expensive, or less accurate processing of an inquiry may be desired for purposes that include, but are not limited to, consistency of output or formatting of output. Situations where sub-optimal solutions are desired include, but are not limited to, sending the results a separate application for processing, outputting the results to a website in a particular format and sending the results to a particular customer. In addition, a given user may not want results that are different from previous similar inquiries even though the results may be better or more accurate, because modifications of results could break subsequent analyzing applications or confuse customers. In addition, changes to results caused by changes to the processing elements can make comparisons of current results to previous results difficult.

Figure 6:
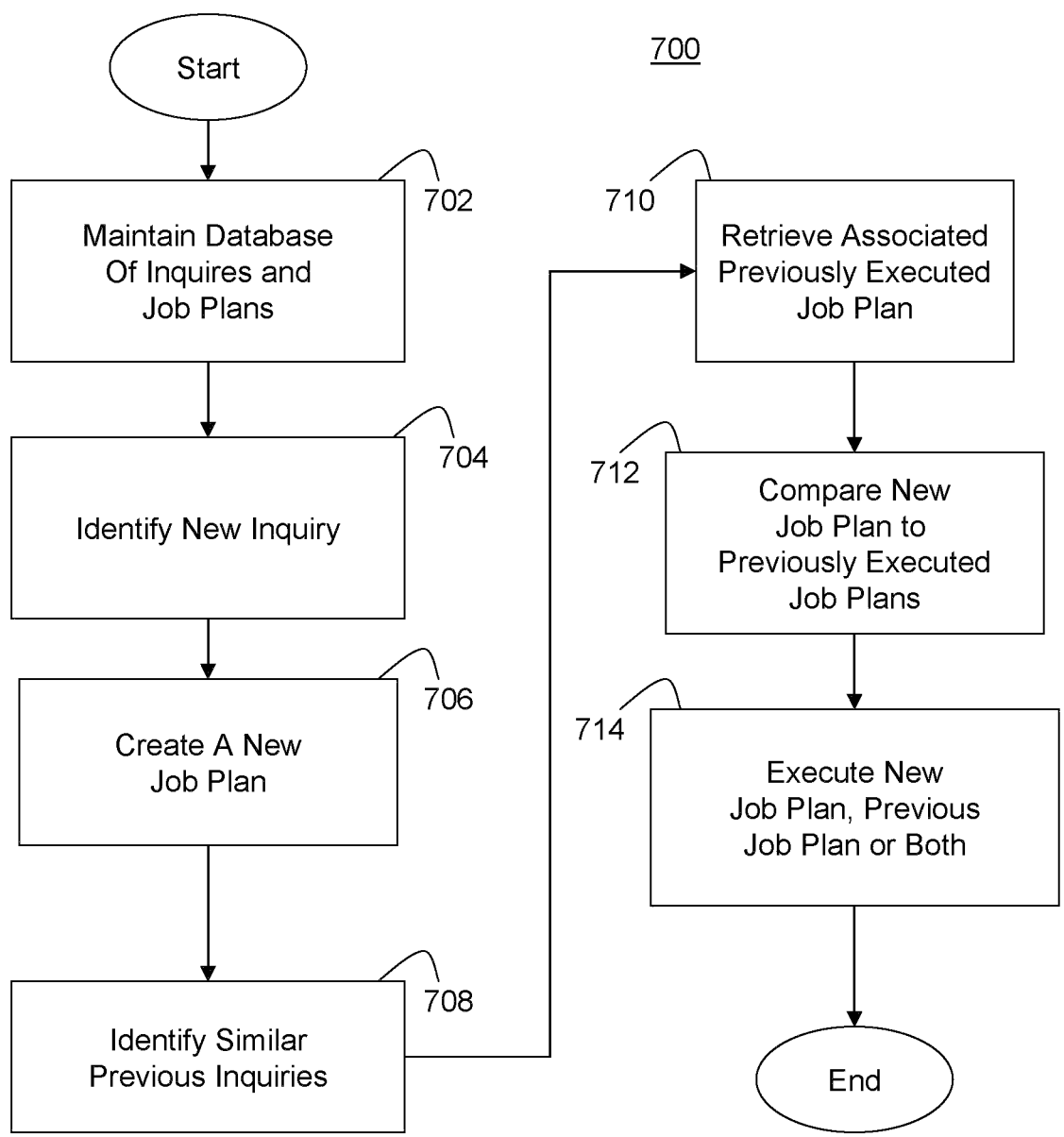
FIG. 6 is a flow chart illustrating an embodiment of a method for processing inquiries over continuous dynamic streams of data in accordance with the present invention.

Referring to FIG. 6, an exemplary embodiment of a method for selecting a set of processing elements from a data stream processing system 700 in accordance with the present invention is illustrated. In one embodiment, a repository or database of inquires previously submitted to the data stream processing system is maintained 702. In addition to the previously submitted inquiries, the job plans created by the job planner and executed are also maintained in the database in association with the previously submitted inquiries for which the job plans were created. Job plans contain the identification of a plurality of processing elements and are created by the job planner as described above. The database of previous inquiries and distributed job plans is located either internal to the data stream processing system, for example at a site, or external to the data stream processing system. In addition, the database can be a single, centrally located database or a plurality of distributed databases.

A new inquiry is identified 704. For example, a new inquiry can be submitted by a user, group or system administrator, among others. The inquiry is forwarded through the data stream processing system to a job planner for evaluation and creation of a new job plan. A new job plan containing a plurality of processing elements using the best currently available processing elements within the data stream processing system is created by the job planner 706. The best currently available processing elements are capable of processing the inquiry over the continuous dynamic stream of data to satisfy user-defined performance criteria. These user-defined performance criteria include, but are not limited to, speed, accuracy, efficiency, cost and combinations thereof. In one embodiment, the new job plan utilizes a single site. Alternatively, a plurality of cooperative, distributed sites is used in the job plan. In general, any type of site capable of processing inquiries over continuous streams of data can be used in creating a sub-optimal job plan in accordance with the present invention.

The new job plan created for the new inquiry is compared to a previously executed job plan created for a previous inquiry that is sufficiently similar to the new inquiry. In addition, the new job plan can be compared to a plurality of previously executed job plans. These previously executed job plans are stored, for example, in the maintained database. In one embodiment, comparison of the new job plan with a previous job plan includes comparing the new inquiry to the log of the previously submitted and processed inquiries and matching one or more previous inquiries to the new inquiry 708. In one embodiment, a desired metric for matching the inquiries is identified. Suitable metrics include any type of search engine matching metric or relevance measure known and available in the art including key word searches. In one embodiment, a threshold for similarity is identified, and all previous inquiries exceeding that threshold are identified. Alternatively, each previous inquiry is assigned a value or weight based on similarity and the highest valued previous inquiry is selected.

Having identified the one or more sufficiently similar previous inquiries, the previously executed job plans associated with identified similar previous inquiries are obtained 710, for example by retrieving these job plans from the database. The new job plan is then compared to the retrieved previously executed job plans 712. Based on this comparison, the new job plan, one or more of the previously executed job plans or a combination of new and previous job plans are executed in the data stream processing system 714. In one embodiment, a user or system administrator can be notified of any differences between the new job plan and previous job plans. These differences include changes to processing elements and changes to the input and output formatting of the processing elements, among others. In one embodiment, the comparison results are reported to the user on if the new job plan differs from the previous job plans by more than a user-defined threshold level. Alternatively, the results of the comparison are not reported a user but the decision regarding which plans to execute is made automatically in accordance with pre-defined parameters. For example, a comparison can be made initially regarding the input and output formatting of the new and previous job plans. If the input and output formatting are the same, then a comparison is made between the processing elements selected for the new job plan versus the processing elements selected for the previous job plans. In one embodiment, the comparison is based on the number of processing elements that are different between the new and previous job plans.

Based on the comparison, a manual or automatic decision is made regarding which job plans to run. The new inquiry can be processed using the new job plan. Alternatively, the new inquiry can be processed using one or more of the previously executed job plans associated with the similar previous inquiries. In one embodiment, the new inquiry is processed using the new job plan and one or more of the previously executed job plans. When multiple job plans are used to process the new inquiry, the results are compared. Since the job plans are processing continuous dynamic streams of data, the results from running the job plans over a given period of time are compared. In one embodiment, this period of time is configured by the user. If the results of all executed job plans are sufficiently similar, all results are logged and the most efficient job plan, based on user-defined criteria, is used for subsequent processing. If the results differ, then a decision is made regarding which job plan to use. In one embodiment, the user or administrator is notified of the results, and the user makes the decision manually regarding which job plan to use. Alternatively, the decision is make automatically in accordance with one or more predefined criteria.

In one embodiment, the new job plan is selected, and previous inquiries are run again using the new job plan. In one embodiment, having selected the desired job plan, either the new job plan or a previous job plan, all subsequent similar inquiries are processed using the selected job plan. In one embodiment, the present invention includes a job management system that provides a list of inquiries and the associated similar jobs upon the submission of a new inquiry. Therefore, the data stream processing system or a user can more effectively manage the processing of inquiries over continuous dynamic streams of data. In accordance with the present invention, a user of a large-scale stream processing framework can maintain consistency between the results of similar inquiries even if new and better processing elements are added between the generation of the job plans for the similar inquiries.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CDR/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for processing inquiries over continuous streams of data in a data stream processing system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for processing inquiries over continuous streams of data, the method, including logic when executed by a processor, comprising:
    identifying a new inquiry to be processed over a continuous dynamic stream of data, the new inquiry newly submitted and not derived from any previous inquiry;
    identifying a new job plan for execution of the new inquiry, the new job plan comprising an identification of a plurality of best currently available processing elements for processing the continuous dynamic stream of data in accordance with the new inquiry;
    identifying a previous inquiry determined to be similar to the new inquiry using keyword searches to identify matching keywords in the previous inquiry and the new inquiry according to a predetermined threshold for similarity; and
    obtaining a previously executed job plan that is associated with the identified previous inquiry, wherein the previously executed job plan includes processing elements that executed the previous inquiry;
    comparing the previously executed job plan with the new job plan based on pre-defined parameters;
    wherein the pre-defined parameter comprises determining whether input and output formatting of processing elements in the previously executed job plan and the identified currently available processing elements for the new job plan are the same; and
    automatically executing, if the input-output formatting is not the same, the previously executed job plan;
    automatically determining, if the input-output formatting is the same, a number of processing elements that are different between the new and previously executed job plan; and
    automatically executing, if there is no difference in the number of processing elements between the new and previously executed job plans, the new job plan or the previously executed job plan or both the new job plan and the previously executed job plan.

2. The method of claim 1, wherein the plurality of best currently available processing elements are capable of satisfying user-defined performance criteria for processing the new inquiry over the continuous dynamic stream of data.

3. The method of claim 2, wherein the user-defined performance criteria comprises speed, accuracy, efficiency, cost or combinations thereof.

4. The method of claim 1, further comprising maintaining a log of previous inquiries and the previously executed job plans associated with each previous inquiry in the log.

5. The method of claim 1, further comprising: comparing the new inquiry to a log of previous inquiries; and
    identifying the previous inquiry from the log of previous using predefined relevance matching metrics.

6. The method of claim 5, wherein the relevance matching metrics comprises the key word searches.

7. The method of claim 5, further comprising obtaining the previously executed job plan associated with the identified previous inquiry that satisfies the relevance metrics.

8. The method of claim 1, further comprising identifying differences between the previously executed job plan and the new job plan; and
    using the identified differences to select at least one of the previously executed job plan and the new job plan for execution.

9. The method of claim 1, wherein:
    the step of executing further comprises executing both the previously executed job plan and the new job plan; and
    the method further comprises: comparing results from the execution of the previously executed job plan and the new job plan; and
    selecting the previously executed job plan or the new job plan based on the results comparison.

10. The method of claim 9, wherein the step of selecting further comprises selecting the new job plan, and the method further comprises using the new job plan to process the previous inquiry associated with the previously executed job plan.

11. The method of claim 9, further comprising using the selected job plan to process subsequent inquiries.

12. The method of claim 1, wherein the step of comparing the new job plan to the previously executed job plan further comprises comparing the new job plan to a plurality of previous inquiries that are determined to be sufficiently similar to the new inquiry using the keyword searches; and
    the step of executing the job plan further comprises executing at least one of the new job plan and one or more the previously executed job plans.

13. A non-transitory computer-readable medium containing a computer-readable code that when read by a computer causes the computer to perform a method for processing inquiries over continuous streams of data, the method comprising:

identifying a new inquiry to be processed over a continuous dynamic stream of data, the new inquiry newly submitted and not derived from any previous inquiry;

identifying a new job plan for execution of the new inquiry, the new job plan comprising an identification of a plurality of best currently available processing elements for processing the continuous dynamic stream of data in accordance with the new inquiry;

identifying a previous inquiry determined to be sufficiently similar to the new inquiry using keyword searches to identify matching keywords in the previous inquiry and the new inquiry according to a predetermined threshold for similarity; and obtaining a previously executed job plan that is associated with the identified previous inquiry, wherein the previously executed job plan includes processing elements that executed the previous inquiry;

comparing the previously executed job plan with the new job plan based on pre-defined parameters;

wherein the pre-defined parameter comprises determining whether input and output formatting of processing elements in the previously executed job plan and the identified currently available processing elements for the new job plan are the same; and automatically executing, if the input-output formatting is not the same, the previously executed job plan;

automatically determining, if the input-output formatting is the same, a number of processing elements that are different between the new and previously executed job plan; and automatically executing, if there is no difference in the number of processing elements between the new and previously executed job plans, the new job plan or the previously executed job plan or both the new job plan and the previously executed job plan.

14. The non-transitory computer-readable medium of claim 13, wherein the plurality of best currently available processing elements are capable of satisfying user-defined performance criteria for processing the new inquiry over the continuous dynamic stream of data.

15. The non-transitory computer-readable medium of claim 14, wherein the user-defined performance criteria comprises speed, accuracy, efficiency, cost or combinations thereof.

16. The non-transitory computer-readable medium of claim 13, wherein the method further comprises:
   comparing the new inquiry to a log of previous inquiries; and
   identifying the previous inquiry from the log of previous inquiries that satisfies a predefined relevance metric.

17. The non-transitory computer-readable medium of claim 16, wherein the method further comprises obtaining the previously executed job plan associated with the identified previous inquiry that satisfies the relevance metric.

18. The non-transitory computer-readable medium of claim 13, wherein:
   the step of executing further comprises executing both the previously executed job plan and the new job plan; and
   the method further comprises:
   comparing results from the execution of the previously executed job plan and the new job plan; and
   selecting the previously executed job plan or the new job plan based on the results comparison.

19. The non-transitory computer-readable medium of claim 18, wherein the step of selecting further comprises selecting the new job plan, and the method further comprises using the new job plan to process the previous inquiry associated with the previously executed job plan.

20. The non-transitory computer-readable medium of claim 18, wherein the method further comprises using the selected job plan to process subsequent inquiries.

* * * * *